(12) United States Patent
Kawauchi

(10) Patent No.: US 12,249,888 B2
(45) Date of Patent: Mar. 11, 2025

(54) LINEAR CONVEYOR

(71) Applicant: YAMAHA HATSUDOKI KABUSHIKI KAISHA, Iwata (JP)

(72) Inventor: Motonori Kawauchi, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 297 days.

(21) Appl. No.: 17/783,534

(22) PCT Filed: Dec. 17, 2019

(86) PCT No.: PCT/JP2019/049358
§ 371 (c)(1),
(2) Date: Jun. 8, 2022

(87) PCT Pub. No.: WO2021/124439
PCT Pub. Date: Jun. 24, 2021

(65) Prior Publication Data
US 2023/0353027 A1    Nov. 2, 2023

(51) Int. Cl.
| H02K 41/03 | (2006.01) |
| H02K 1/16 | (2006.01) |
| H02K 11/01 | (2016.01) |
| H02K 11/215 | (2016.01) |

(52) U.S. Cl.
CPC ............ H02K 41/031 (2013.01); H02K 1/16 (2013.01); H02K 11/014 (2020.08); H02K 11/215 (2016.01); *H02K 2201/15* (2013.01)

(58) Field of Classification Search
CPC ...... H02K 11/014; H02K 1/16; H02K 11/215; H02K 41/031; H02K 11/0141; H02K 2201/15

USPC ...................................................... 310/12.19
See application file for complete search history.

(56) References Cited

U.S. PATENT DOCUMENTS

| 3,791,309 A | * | 2/1974 | Baermann ............. F16C 39/063 |
| | | | 104/286 |
| 2011/0198947 A1 | * | 8/2011 | Lin ........................ H02K 41/02 |
| | | | 310/12.33 |

FOREIGN PATENT DOCUMENTS

| JP | 2001-339934 A | 12/2001 |
| JP | 2002-191164 A | 7/2002 |
| JP | 2002-289429 A | 10/2002 |
| JP | 2002-354779 A | 12/2002 |
| JP | 2005-134408 A | 5/2005 |
| JP | 2006-320049 A | 11/2006 |
| JP | 2013-046464 A | 3/2013 |
| JP | 2013-099208 A | 5/2013 |
| JP | 2013-102562 A | 5/2013 |
| JP | 2015-032609 A | 2/2015 |

(Continued)

OTHER PUBLICATIONS

Translation of foreign document JP 2002354779 A (Year: 2002).*

(Continued)

*Primary Examiner* — Alex W Mok
(74) *Attorney, Agent, or Firm* — Studebaker Brackett PLLC

(57) ABSTRACT

A linear conveyor includes a linear motor stator including a stator including a core and a coil, and a magnetic sensor configured to detect a position of a slider. The linear conveyor further includes a magnetic shielding member arranged between the magnetic sensor and the linear motor stator and configured to shield magnetic flux from the linear motor stator toward the magnetic sensor.

20 Claims, 7 Drawing Sheets

(56) References Cited

FOREIGN PATENT DOCUMENTS

| JP | 2015-049109 A | 3/2015 |
| WO | 2018/055709 A1 | 3/2018 |

OTHER PUBLICATIONS

International Search Report issued in PCT/JP2019/049358; mailed Feb. 25, 2020.
Written Opinion issued in PCT/JP2019/049358; mailed Feb. 25, 2020.
An Office Action; "Notice of Reasons for Refusal," mailed by the Japanese Patent Office on May 9, 2023, which corresponds to Japanese Patent Application No. 2021-565199 and is related to U.S. Appl. No. 17/783,534; with English language translation.

* cited by examiner

FIRST EMBODIMENT 100-100 LINE SECTIONAL VIEW

FIG.9
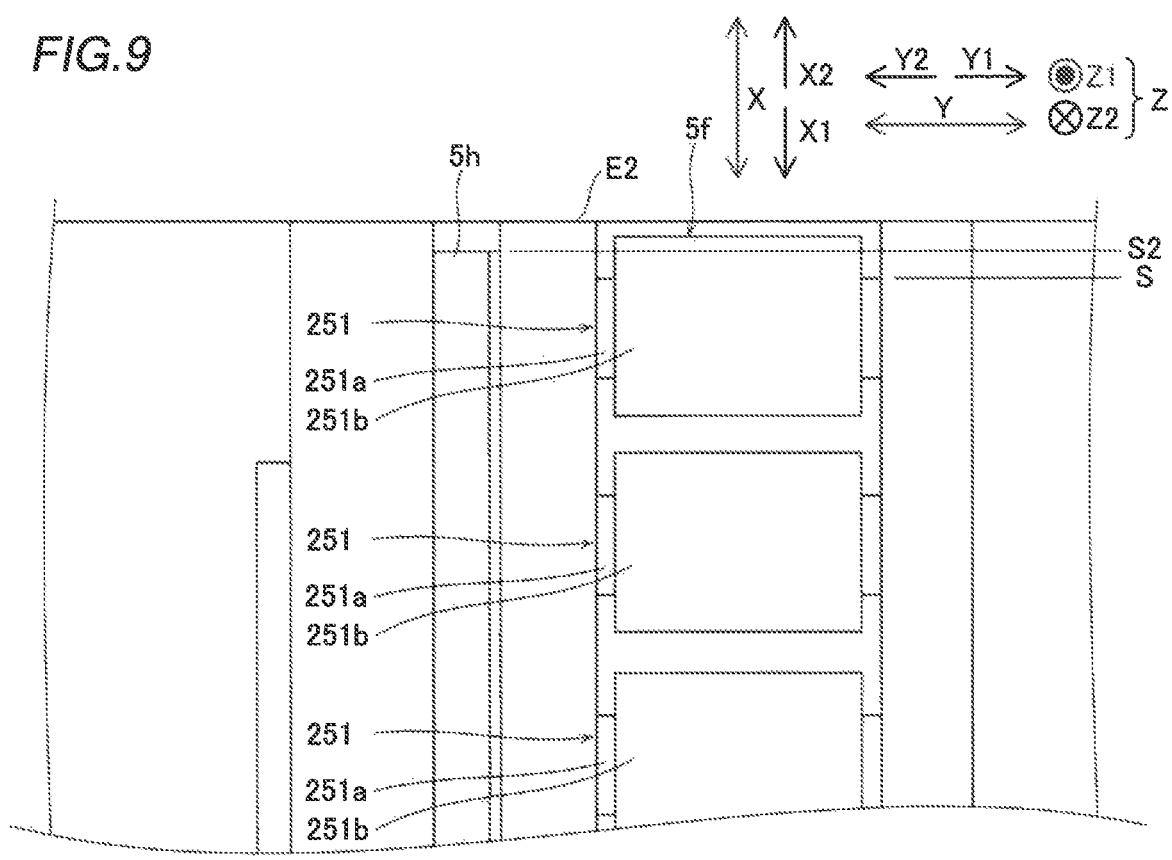
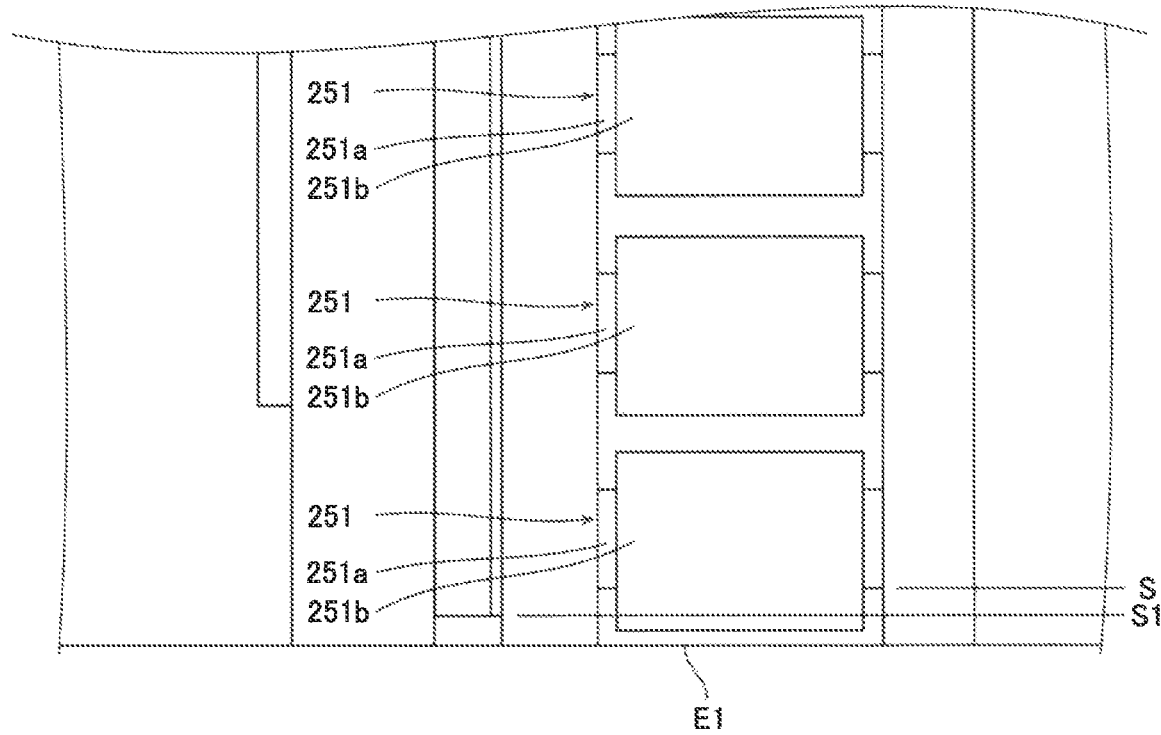

SECOND EMBODIMENT

LINEAR CONVEYOR

CROSS-REFERENCE TO RELATED APPLICATION

This application is a National Stage of International Patent Application No. PCT/JP2019/049358, filed Dec. 17, 2019, the entire content of which is incorporated herein by reference.

BACKGROUND

Technical Field

The present disclosure relates to a linear conveyor, and more particularly, it relates to a linear conveyor including a magnetic sensor to detect the position of a slider.

Background Art

Conventionally, a linear conveyor including a magnetic sensor to detect the position of a slider is known. Such a linear conveyor is disclosed in International Publication No. 2018/055709, for example.

International Publication No. 2018/055709 discloses a linear conveyor device (linear conveyor) including a magnetic sensor to detect the position of a slider. The linear conveyor device includes the slider, a linear motor stator, and a guide rail. The slider includes a linear motor mover. The linear motor stator includes a core and a coil wound around the core. The core extends in an upward-downward direction and in a right-left direction orthogonal to a direction in which the guide rail extends. The magnetic sensor detects a change in magnetic flux due to movement of the slider.

The slider disclosed in International Publication No. 2018/055709 is supported by the guide rail while the slider is movable in the direction in which the guide rail extends. The slider is moved along the direction in which the guide rail extends by the linear motor stator and the linear motor mover. The upper surface of the slider serves as a placement portion for a workpiece such as a printed circuit board.

Thus, in the linear conveyor device, the slider is moved based on the position of the slider detected by the magnetic sensor to move the placement portion for a workpiece to a predetermined position such that electronic components or the like are mounted on a printed circuit board.

In the linear conveyor device disclosed in International Publication No. 2018/055709, the position of the slider is detected based on the change in magnetic flux detected by the magnetic sensor. In this linear conveyor device, the magnetic sensor and the linear motor stator are arranged such that the direction of the magnetic flux detected by the magnetic sensor and the direction of the magnetic flux emitted from the linear motor stator are different from each other in order to significantly reduce or prevent erroneous detection of magnetic flux emitted from the linear motor stator by the magnetic sensor. Furthermore, in the linear conveyor device, conceivably, the magnetic sensor and the linear motor stator are arranged such that a distance between the magnetic sensor and the linear motor stator is as large as possible in order to significantly reduce or prevent erroneous detection of magnetic flux by the magnetic sensor.

SUMMARY

However, in the linear conveyor device disclosed in International Publication No. 2018/055709, it is necessary to arrange the magnetic sensor and the linear motor stator in the linear conveyor device such that the direction of the magnetic flux detected by the magnetic sensor and the direction of the magnetic flux emitted from the linear motor stator are different from each other in order to significantly reduce or prevent erroneous detection of magnetic flux by the magnetic sensor, and thus the degree of freedom of the arrangement positions of the magnetic sensor and the linear motor stator is limited. Although not disclosed in the linear conveyor device of International Publication No. 2018/055709, the degree of freedom of the arrangement positions of the magnetic sensor and the linear motor stator is limited due to the distance between the magnetic sensor and the linear motor stator even in the case of a conventional linear conveyor device in which the distance between the magnetic sensor and the linear motor stator is increased in order to significantly reduce or prevent erroneous detection of magnetic flux by the magnetic sensor. Therefore, in the linear conveyor device disclosed in International Publication No. 2018/055709, it is desired to reduce the size of the linear conveyor device (linear conveyor) by improving the degree of freedom of the arrangement positions of the magnetic sensor and the linear motor stator while significantly reducing or preventing erroneous detection of magnetic flux by the magnetic sensor.

Accordingly, the present disclosure provides a linear conveyor capable of reducing its size by improving the degree of freedom of the arrangement positions of a magnetic sensor and a linear motor stator while significantly reducing or preventing erroneous detection of magnetic flux by the magnetic sensor.

A linear conveyor according to an aspect of the present disclosure includes a linear motor stator including a stator including a core and a coil wound around the core, a slider including a linear motor mover including a permanent magnet, a guide rail configured to guide movement of the slider, a magnetic sensor configured to detect a position of the slider, and a magnetic shielding member arranged between the magnetic sensor and the linear motor stator and configured to shield magnetic flux from the linear motor stator toward the magnetic sensor.

As described above, the linear conveyor according to this aspect of the present disclosure includes the magnetic shielding member arranged between the magnetic sensor and the linear motor stator and configured to shield the magnetic flux from the linear motor stator toward the magnetic sensor. Accordingly, the magnetic flux emitted from the linear motor stator is shielded by the magnetic shielding member such that it is possible to significantly reduce or prevent erroneous detection of the magnetic sensor due to the magnetic flux emitted from the linear motor stator. Therefore, it is not necessary to arrange the magnetic sensor and the linear motor stator such that the direction of the magnetic flux emitted from the linear motor stator and the direction of magnetic flux detected by the magnetic sensor are different from each other, and it is not necessary to increase a distance between the magnetic sensor and the linear motor stator. Thus, the magnetic shielding member can improve the degree of freedom of the arrangement positions of the magnetic sensor and the linear motor stator. Consequently, the size of the linear conveyor can be reduced by improving the degree of freedom of the arrangement positions of the magnetic sensor and the linear motor stator while significantly reducing or preventing erroneous detection of the magnetic sensor.

In the aforementioned linear conveyor according to this aspect, the magnetic shielding member is preferably configured to shield the magnetic flux from the linear motor stator toward the magnetic sensor by drawing in magnetic flux emitted from the linear motor stator. Accordingly, the magnetic flux from the linear motor stator toward the magnetic sensor is drawn by the magnetic shielding member such that it is possible to make it difficult for the magnetic flux to reach the magnetic sensor, and thus the accuracy of detecting the position of the slider by the magnetic sensor due to the magnetic flux emitted from the linear motor stator can be easily ensured.

In the aforementioned linear conveyor according to this aspect, the magnetic shielding member preferably has a plate shape extending along a direction in which the guide rail extends. Accordingly, the magnetic flux emitted from the linear motor stator can be shielded in the direction in which the guide rail extends, and thus it is possible to make it difficult for the magnetic flux emitted from the linear motor stator to reach the magnetic sensor. Furthermore, the magnetic shielding member has a plate shape extending along the direction in which the guide rail extends such that the thickness of the magnetic shielding member can be reduced as compared with a case in which the magnetic shielding member has a block shape, and thus it is possible to significantly reduce or prevent an increase in the size of the linear conveyor.

In this case, the linear motor stator, the magnetic shielding member, and the magnetic sensor are preferably arranged side by side along a width direction of the guide rail orthogonal to the direction in which the guide rail extends, the core preferably extends along the width direction of the guide rail, and the magnetic shielding member having the plate shape is preferably sized to cover at least the core of the stator in the width direction of the guide rail. Accordingly, at least a location (the core of the stator) at which the magnetic flux is most emitted can be covered by the magnetic shielding member, and thus the magnetic flux emitted from the linear motor stator can be effectively shielded by the magnetic shielding member.

In the aforementioned linear conveyor including the plate-shaped magnetic shielding member that covers at least the core, in a direction orthogonal to the direction in which the guide rail extends and the width direction of the guide rail, the magnetic shielding member having the plate shape preferably has a length larger than a length of the core. Accordingly, a wider range in the orthogonal direction than the core can be covered by the magnetic shielding member, and thus it is possible to more effectively shield the magnetic flux heading toward the magnetic sensor while spreading from the linear motor stator.

In the aforementioned linear conveyor including the plate-shaped magnetic shielding member that covers at least the core, the stator preferably includes a plurality of stators arranged side by side along the direction in which the guide rail extends, and in the direction in which the guide rail extends, the magnetic shielding member having the plate shape preferably extends outward beyond the core of the stator arranged at an end among the plurality of stators. Accordingly, cores of the plurality of stators arranged side by side along the direction in which the guide rail extends can be covered, and thus the magnetic flux emitted from the linear motor stator to the magnetic shielding member can be effectively shielded.

In the aforementioned linear conveyor including the plurality of stators arranged side by side along the direction in which the guide rail extends, the magnetic shielding member preferably includes a first-side end extending to a first side in the direction in which the guide rail extends beyond the core of the stator arranged at a first-side end among the plurality of stators, and a second-side end extending to a second side in the direction in which the guide rail extends beyond the core of the stator arranged at a second-side end among the plurality of stators. Accordingly, the cores of the plurality of stators arranged side by side along the direction in which the guide rail extends can be covered from the first-side end to the second-side end in the direction in which the guide rail extends by the magnetic shielding member, and thus the magnetic flux from the linear motor stator toward the magnetic sensor can be more reliably shielded.

The aforementioned linear conveyor according to this aspect preferably further includes a fastening member configured to attach the magnetic shielding member, the magnetic shielding member preferably includes an insertion hole into which the fastening member is inserted, and the insertion hole preferably includes, at an edge thereof on a linear motor stator side, an insertion hole bent portion bent toward the linear motor stator. Accordingly, the magnetic flux shielded by the magnetic shielding member and released from the edge of the insertion hole can be released to the linear motor stator side along the insertion hole bent portion, and thus it is possible to make it difficult for the magnetic flux released from the magnetic shielding member to reach the magnetic sensor.

In this case, the fastening member is preferably made of a non-magnetic material. Accordingly, unlike a case in which the fastening member is made of a magnetic material, the fastening member is not magnetized, and thus it is possible to significantly reduce or prevent the possibility that magnetic flux emitted from the fastening member due to magnetization of the fastening member caused by the magnetic flux emitted from the linear motor stator reaches the magnetic sensor. Consequently, it is possible to make it difficult for the magnetic flux emitted from the linear motor stator to reach the magnetic sensor.

In the aforementioned linear conveyor according to this aspect, the magnetic shielding member is preferably configured to draw in magnetic flux emitted from the linear motor stator toward the magnetic sensor and to release the magnetic flux to a linear motor stator side. Accordingly, the magnetic flux drawn into the magnetic shielding member can be released to the side (linear motor stator side) opposite to the magnetic sensor side, and thus it is possible to make it difficult for the magnetic flux released from the magnetic shielding member to reach the magnetic sensor.

In this case, in a direction orthogonal to a direction in which the guide rail extends and a width direction of the guide rail orthogonal to the direction in which the guide rail extends, the magnetic shielding member preferably includes at least one of a first bent portion bent such that a first end is directed to the linear motor stator side or a second bent portion bent such that a second end is directed to the linear motor stator side. Accordingly, the magnetic flux drawn into the magnetic shielding member can be released to the side (linear motor stator side) opposite to the magnetic sensor side by at least one of the first bent portion or the second bent portion. Furthermore, at least one of the first bent portion or the second bent portion is provided such that it is possible to significantly reduce or prevent an increase in the size of the magnetic shielding member in the orthogonal direction as compared with a magnetic shielding member including a first end and a second end straightened (not bent) along the orthogonal direction. Consequently, it is possible to make it difficult for the magnetic flux released from the magnetic shielding member to reach the magnetic sensor and to significantly reduce or prevent an increase in the size of the linear conveyor in the orthogonal direction.

In the aforementioned linear conveyor including the magnetic shielding member that releases the drawn magnetic flux to the linear motor stator side, the magnetic shielding member preferably includes at least one of a first-side bent portion bent such that a first-side end in a direction in which the guide rail extends is directed to the linear motor stator side or a second-side bent portion bent such that a second-side end in the direction in which the guide rail extends is directed to the linear motor stator side. Accordingly, the magnetic flux drawn into the magnetic shielding member can be released to the side (linear motor stator side) opposite to the magnetic sensor side by at least one of the first-side bent portion or the second-side bent portion. Furthermore, at least one of the first-side bent portion or the second-side bent portion is provided such that an increase in the size of the magnetic shielding member in the direction in which the guide rail extends can be significantly reduced or prevented as compared with a magnetic shielding member including a first-side end and a second-side end straightened (not bent) along the direction in which the guide rail extends. Consequently, it is possible to make it difficult for the magnetic flux released from the magnetic shielding member to reach the magnetic sensor and to significantly reduce or prevent an increase in the size of the linear conveyor in the direction in which the guide rail extends.

In the aforementioned linear conveyor according to this aspect, the slider preferably further includes a magnetic scale facing the magnetic sensor and configured to emit magnetic flux detected by the magnetic sensor, the core of the stator preferably extends along a direction in which the magnetic sensor and the magnetic scale face each other, and the magnetic shielding member is preferably arranged between the core and both the magnetic sensor and the magnetic scale in the direction in which the magnetic sensor and the magnetic scale face each other. Accordingly, the magnetic flux from the linear motor stator toward the magnetic scale is shielded by the magnetic shielding member such that it is possible to make it difficult for the magnetic flux to reach the magnetic scale, and thus the magnetic scale can be protected from the magnetic flux emitted from the linear motor stator.

The aforementioned linear conveyor according to this aspect preferably further includes a support member configured to support the linear motor stator and the guide rail, the support member preferably includes a mounting wall provided between the magnetic sensor and the linear motor stator and protruding upward, the magnetic sensor is preferably attached to a side surface of the mounting wall on a side opposite to a linear motor stator side, and the magnetic shielding member is preferably attached to a side surface on the linear motor stator side of the mounting wall common to the magnetic sensor. Accordingly, the magnetic sensor and the magnetic shielding member are attached to the common mounting wall such that it is possible to significantly reduce or prevent the complexity of the structure of the support member and an increase in the size of the support member, and thus it is possible to significantly reduce or prevent the complexity of the structure of the linear conveyor and an increase in the size of the linear conveyor.

In the aforementioned linear conveyor according to this aspect, the stator preferably includes a plurality of stators arranged side by side along a direction in which the guide rail extends, the linear conveyor preferably further comprises a plurality of unit members provided by dividing the plurality of stators for each predetermined section and separately controlled to be energized, each of the plurality of unit members preferably includes the magnetic sensor, and the magnetic shielding member is preferably arranged between the magnetic sensor and the stator over all of the plurality of unit members. Accordingly, even when the energization control is performed over two or more unit members and magnetic flux is emitted from the stators, the magnetic flux can be reliably shielded by the magnetic shielding member, and thus the accuracy of detecting the position of the slider by the magnetic sensor can be ensured.

In the aforementioned linear conveyor according to this aspect, the magnetic shielding member is preferably made of a magnetic material. Accordingly, the magnetic shielding member is magnetized by the magnetic flux from the linear motor stator toward the magnetic sensor such that the magnetic flux from the linear motor stator toward the magnetic sensor can be drawn by the magnetic shielding member. Consequently, it is possible to make it difficult for the magnetic flux to reach the magnetic sensor, and thus the accuracy of detecting the position of the slider by the magnetic sensor can be ensured.

In this case, the magnetic shielding member as the magnetic material is preferably made of a magnetic iron-based material such as iron or steel. Accordingly, the magnetic shielding member can be easily magnetized by the magnetic flux from the linear motor stator toward the magnetic sensor, and thus the magnetic flux from the linear motor stator toward the magnetic sensor can be reliably drawn by the magnetic shielding member.

According to the present disclosure, as described above, it is possible to reduce the size of the linear conveyor by improving the degree of freedom of the arrangement positions of the magnetic sensor and the linear motor stator while significantly reducing or preventing erroneous detection of magnetic flux by the magnetic sensor.

BRIEF DESCRIPTION OF THE DRAWINGS

FIG. 9 is a plan view showing an end on the X1 direction side and an end on the X2 direction side of the linear conveyor module of the linear conveyor according to the first embodiment from which the cover member has been removed, as viewed from the Z1 direction side;

DETAILED DESCRIPTION

Embodiments embodying the present disclosure are hereinafter described on the basis of the drawings.

First Embodiment

A linear conveyor 101 according to a first embodiment installed on a platform 102 is now described with reference to FIGS. 1 to 9.

Configuration of Linear Conveyor

Figure 1:
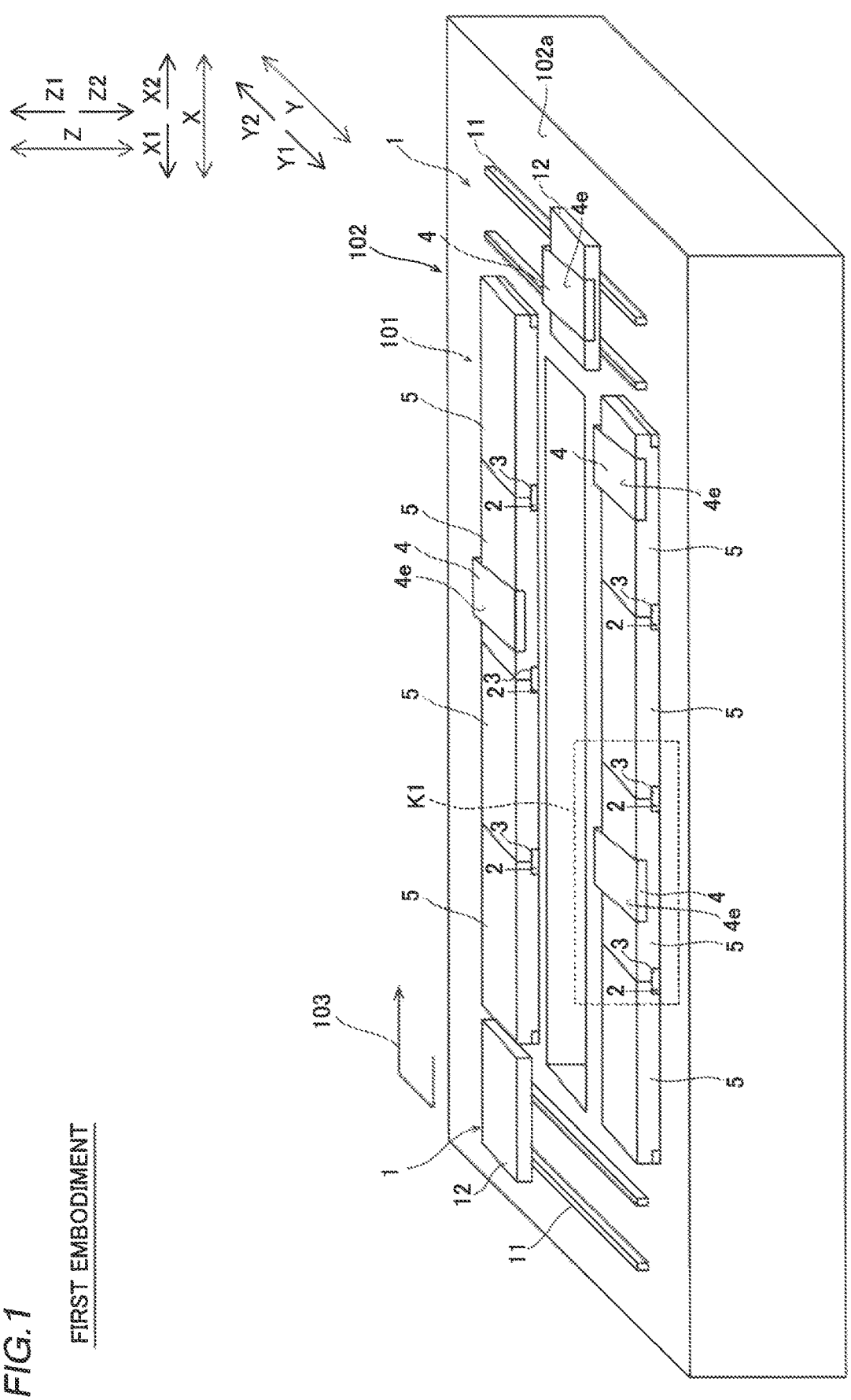
FIG. 1 is a perspective view showing a linear conveyor installed on a platform according to a first embodiment.
Figure 2:
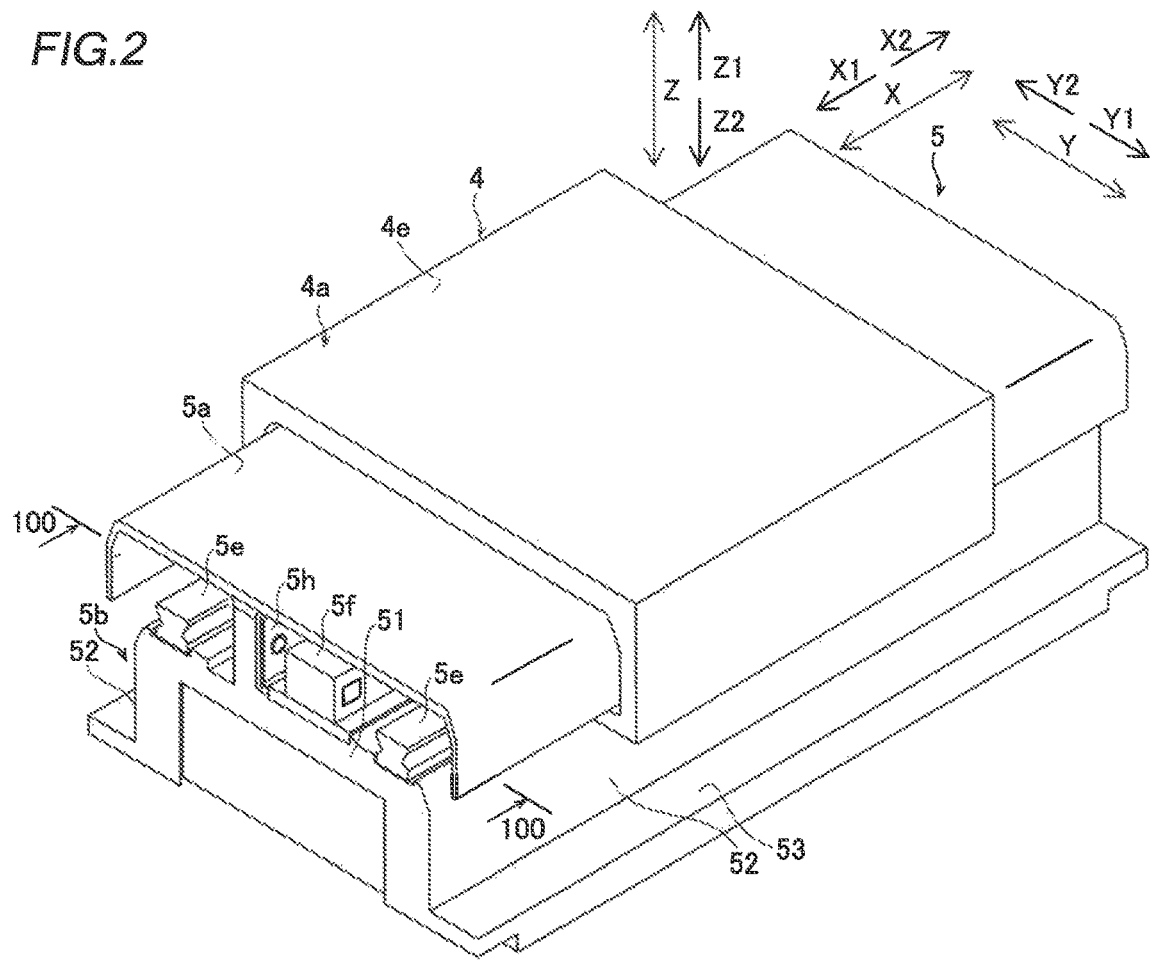
FIG. 2 is a perspective view showing a linear conveyor module and a slider of the linear conveyor according to the first embodiment.

As shown in FIGS. 1 and 2, the linear conveyor 101 is installed on the upper surface 102a of the flatform 102. Although not shown, various robots for transferring a workpiece such as a printed circuit board and mounting electronic components or the like on the printed circuit board, for example, are installed on the platform 102. The various robots are arranged along a go-around path 103 of sliders 4 described below.

The linear conveyor 101 moves the sliders 4 toward the operation positions of the various robots. Specifically, the linear conveyor 101 includes a plurality of (two) direction changing modules 1, a plurality of (six) recesses 2, a plurality of (six) connecting members 3, the sliders 4, and a plurality of (eight) linear conveyor modules 5. The plurality of direction changing modules 1 and the plurality of linear conveyor modules 5 form the go-around path 103 of the sliders 4.

A direction in which the linear conveyor modules 5 extend is defined as an X direction, one direction in the X direction is defined as an X1 direction, and the other direction in the X direction is defined as an X2 direction. A direction in which the direction changing modules 1 extend is defined as a Y direction, one direction in the Y direction is defined as a Y1 direction, and the other direction in the Y direction is defined as a Y2 direction. A direction orthogonal to the X and Y directions is defined as a Z direction (upward-downward direction), one direction in the Z direction is defined as a Z1 direction (upward direction), and the other direction in the Z direction is defined as a Z2 direction (downward direction). The X direction is an example of a "direction in which the guide rail extends" in the claims. The Y direction is an example of a "width direction of the guide rail" in the claims. The Z direction is an example of a "direction orthogonal to the direction in which the guide rail extends and the width direction of the guide rail" or a "direction orthogonal to the direction in which the guide rail extends and the width direction of the guide rail orthogonal to the direction in which the guide rail extends" in the claims.

The plurality of (two) direction changing modules 1 are arranged on the X1 direction side and the X2 direction side, respectively. The structure of each of the plurality of direction changing modules 1 is the same, and thus only the direction changing module 1 on the X1 direction side is described.

The direction changing module 1 is a conveyance device that moves the sliders 4 in the Y direction.

The direction changing module 1 includes guide rails 11, a module main body 12, and a drive mechanism (not shown). The guide rails 11 are laid on the upper surface 102a of the platform 102. The guide rails 11 extend in the Y direction. The module main body 12 is supported by the guide rails 11 so as to be movable in the Y direction. The drive mechanism moves the module main body 12 in the Y direction along the guide rails 11.

The recesses 2 accommodate the connecting members 3 fixed to the platform 102. That is, as viewed from the Y1 direction side, the connecting members 3 fixed to the platform 102 are arranged between the inner surfaces of the recesses 2 and the upper surface 102a of the platform 102.

The connecting members 3 are fixed to the platform 102, connect the plurality of linear conveyor modules 5 to each other, and position the linear conveyor modules 5 while being fixed to the platform 102. The connecting members 3 are provided across the adjacent linear conveyor modules 5 in the X direction.

As shown in FIG. 1, a plurality of (four) sliders 4 are arranged on the go-around path 103. The plurality of sliders 4 all have the same configuration, and thus one of the plurality of sliders 4 is described.

Figure 3:
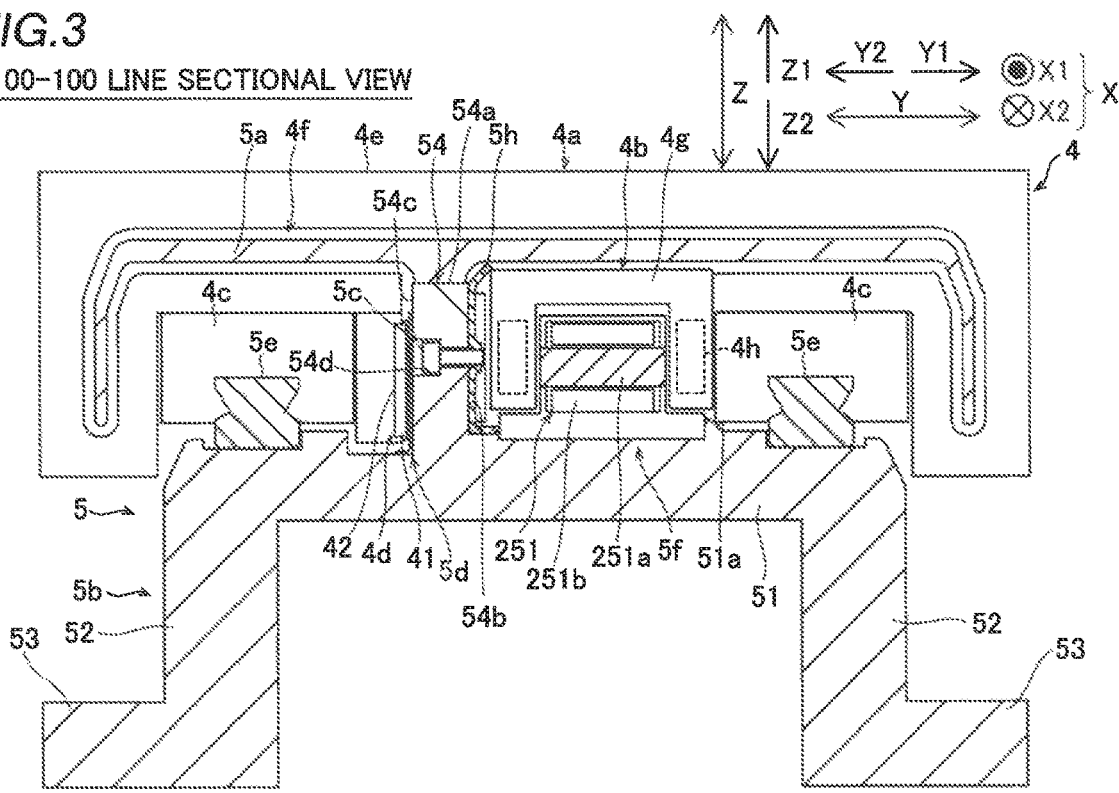
FIG. 3 is a sectional view taken along the line 100-100 in FIG. 2.

The slider 4 slides linearly on the go-around path 103. Specifically, as shown in FIGS. 2 and 3, the slider 4 includes a slider frame 4a, a linear motor mover 4b, a pair of guide blocks 4c, and a magnetic scale 4d.

The slider frame 4a is made of a metal material such as aluminum. The upper surface of the slider frame 4a on the Z1 direction side is a placement surface 4e on which the workpiece is placed. The slider frame 4a includes an insertion space 4f into which cover members 5a of the linear conveyor modules 5 described below are inserted.

The linear motor mover 4b includes a back yoke 4g and permanent magnets 4h. The back yoke 4g is a member that holds the permanent magnets 4h and forms a magnetic path, and is made of a magnetic iron-based material such as iron or steel. The back yoke 4g has a portal structure that opens in the Z2 direction. The permanent magnets 4h are arranged such that the N poles and the S poles thereof face each other in the Y direction. In the permanent magnets 4h, a plurality of N poles and S poles are alternately aligned along the X direction. In such an arrangement, the permanent magnets 4h are held by the back yoke 4g. The back yoke 4g covers all the permanent magnets 4h in the X direction.

The guide blocks 4c engage with guide rails 5e of the linear conveyor modules 5 described below and are movable along a direction (X direction) in which the guide rails 5e extend. The guide blocks 4c each include a bearing that rolls in contact with the guide rails 5e. The pair of guide blocks 4c are arranged in the Y direction. Ends of the guide blocks 4c on the Z1 direction side are attached to the slider frame 4a.

The magnetic scale 4d faces magnetic sensors 152 described below in the Y direction, and emits magnetic flux detected by the magnetic sensors 152. Specifically, the magnetic scale 4d includes a scale substrate 41 and a holder 42. The scale substrate 41 is held by the holder 42. The scale substrate 41 includes permanent magnets (not shown) arranged in the X direction such that the N poles and S poles thereof appear alternately on a surface facing magnetic sensor units 5d. Although not shown, the permanent magnets of the scale substrate 41 face the magnetic sensors 152 (see FIG. 4) of the magnetic sensor units 5d in the Y direction.

The plurality of linear conveyor modules 5 are linearly connected to each other in the X direction. Four of the plurality of linear conveyor modules 5 are arranged on the Y1 direction side. Four of the plurality of linear conveyor modules 5 are arranged on the Y2 direction side. The structures of the plurality of linear conveyor modules 5 are the same, and thus the linear conveyor module 5 (in a K portion of FIG. 1) arranged on the Y1 direction side and on the X1 direction side of a central portion in the X direction is described. Two to seven or nine or more linear conveyor modules 5 may be arranged on the platform 102.

The linear conveyor module 5 is a conveyance device that moves the sliders 4 in the X direction. That is, the linear conveyor module 5 stops the slider 4 at the operation position of the robot and moves the slider 4 toward the next operation position of the robot after the operation. The linear conveyor module 5 is a linear module having a length of about 0.2 to about 1.0 [m].

Specifically, as shown in FIGS. 2 and 3, the linear conveyor module 5 includes the cover member 5a, a support member 5b, fastening members 5c, the magnetic sensor units 5d, the guide rails 5e, and a linear motor stator 5f, unit members 5g (see FIG. 6), and a magnetic shielding member 5h.

The cover member 5a is made of metal such as aluminum. The cover member 5a covers the upper surface 51a (a surface on the Z1 direction side) of the support member 5b. That is, the cover member 5a covers the linear motor stator 5f, the guide rails 5e, and the magnetic sensor units 5d attached to the support member 5b from the Z1 direction side. The cover member 5a is fixed to an end of the support member 5b on the Z1 direction side by a fastening member (not shown). The cover member 5a has a shape that enables insertion into the insertion space 4f of the slider frame 4a. That is, the cover member 5a has a substantially T-shape in its cross-section along the Y direction.

The support member 5b supports the guide rails 5e and the linear motor stator 5f. The support member 5b is made of metal such as aluminum. Thus, the support member 5b is a metal frame. The support member 5b has a substantially U-shape in its cross-section along the Y direction. The support member 5b includes an upper wall 51, a pair of side walls 52, flanges 53, and a mounting wall 54.

Figure 4:
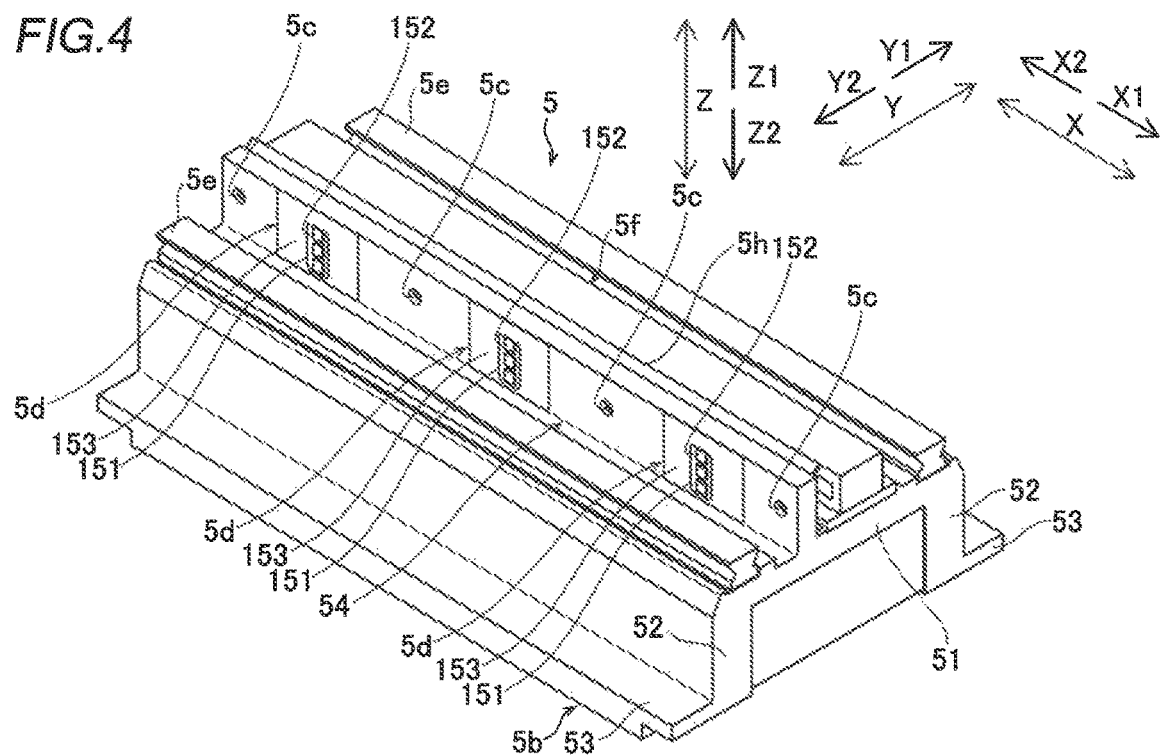
FIG. 4 is a perspective view showing the linear conveyor module of the linear conveyor according to the first embodiment from which a cover member has been removed, as viewed from the Y2 direction side.

As shown in FIGS. 3 and 4, the upper wall 51 has a rectangular shape extending in the X direction. The linear motor stator 5f, the guide rails 5e, and the magnetic sensor units 5d are installed on the upper surface 51a of the upper wall 51. The side wall 52 has a rectangular shape extending long in the X direction. The pair of side walls 52 face each other in the Y direction. The flanges 53 protrude outward in the Y direction from ends of the side walls 52 on the Z2 direction side. The flanges 53 each has a rectangular shape extending in the X direction.

The mounting wall 54 is integrally provided on the upper wall 51. That is, the mounting wall 54 is provided between the magnetic sensors 152 and the linear motor stator 5f, and protrudes upward. The mounting wall 54 includes an upper surface 54a, a motor-side side surface 54b, a sensor-side side surface 54c, and through-holes 54d. The motor-side side surface 54b is an example of a "side surface of the mounting wall on the linear motor stator side" in the claims. The sensor-side side surface 54c is an example of a "side surface of the mounting wall on a side opposite to the linear motor stator side" in the claims.

The upper surface 54a is a surface of the mounting wall 54 on the Z1 direction side. The cover member 5a is attached to the upper surface 54a. The motor-side side surface 54b is a surface on the Y1 direction side. The magnetic shielding member 5h is attached to the motor-side side surface 54b. The sensor-side side surface 54c is a surface on the Y2 direction side. The magnetic sensor units 5d are attached to the sensor-side side surface 54c. Thus, the magnetic sensors 152 are attached to the sensor-side side surface 54c, and the magnetic shielding member 5h is attached to the motor-side side surface 54b of the mounting wall 54 common to the magnetic sensors 152. The through-holes 54d pass through the mounting wall 54 along the Y direction. The through-holes 54d are counterbores into which the fastening members 5c are inserted. A plurality of (four) through-holes 54d are formed along the X direction in the mounting wall 54. The plurality of through-holes 54d are formed in a central portion of the mounting wall 54 in the Z direction. The number of through-holes 54d may be one to three or 5 or more.

The fastening members 5c attach the magnetic shielding member 5h to the support member 5b. Specifically, the fastening members 5c are screwed into the magnetic shielding member 5h while being inserted into the through-holes 54d to fix the magnetic shielding member 5h to the mounting wall 54. The fastening members 5c are made of a non-magnetic material. Specifically, the fastening members 5c are made of austenitic stainless steel. A plurality of (four) fastening members 5c are arranged in accordance with the plurality of (four) through-holes 54d. That is, the fastening members 5c are arranged in the central portion of the mounting wall 54 in the Z direction in accordance with the through-holes 54d. The number of fastening members 5c may be any number such as one to three or five or more as long as the number of fastening members 5c is the same as the number of through-holes 54d.

A plurality of (three) magnetic sensor units 5d are arranged at a predetermined pitch in the X direction. A plurality of magnetic sensor units 5d may not be arranged at a predetermined pitch in the X direction. For example, sensor-to-sensor pitches between the magnetic sensor units are set and stored them in a storage of a controller (not shown) such that it is possible to arrange a plurality of magnetic sensor units by making the sensor-to-sensor pitches between the magnetic sensor units different. The number of magnetic sensor units 5d may be one, two, or four or more.

The magnetic sensor units 5d each include a sensor substrate 151, magnetic sensors 152, and a housing 153.

The magnetic sensors 152 detect the position of the slider 4. Specifically, the magnetic sensors 152 detect the position of the slider 4 in the X direction. A plurality of (three) magnetic sensors 152 are attached to the sensor substrate 151 along the Z direction. That is, the plurality of (three) magnetic sensors 152 are arranged along a direction in which the mounting wall 54 protrudes. The number of magnetic sensors 152 may be one, two, or four or more. The magnetic sensors 152 are Hall elements or MR (magnet resistive) elements, for example. The magnetic sensors 152 generate a signal of an output voltage corresponding to the magnetic flux density by detecting the magnetic flux of the magnetic scale 4d of the slider 4. The housing 153 holds the sensor substrate 151. The housing 153 is fixed to the mounting wall 54 of the support member 5b by a fastening member (not shown).

The guide rails 5e have a function of guiding the slider 4. A pair of guide rails 5e face each other in the Y direction. The guide rails 5e extend in the X direction.

Figure 5:
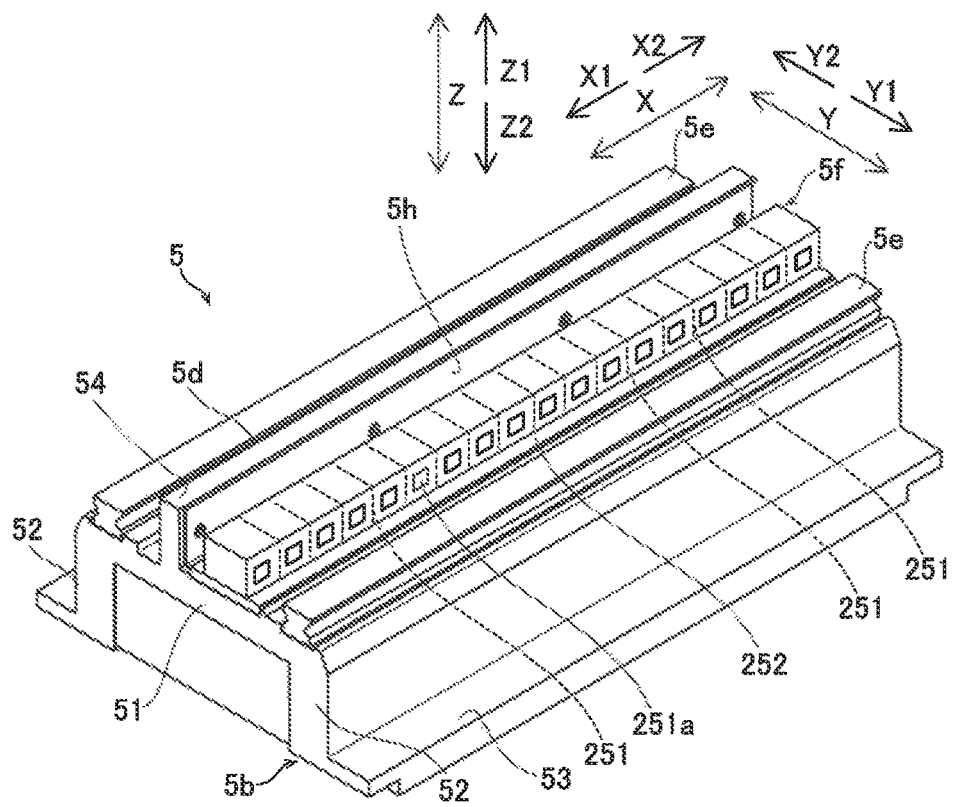
FIG. 5 is a perspective view showing the linear conveyor module of the linear conveyor according to the first embodiment from which the cover member has been removed, as viewed from the Y1 direction side.

As shown in FIGS. 3 and 5, the linear motor stator 5f includes a plurality of electromagnets. That is, the linear motor stator 5f includes stators 251 and a holder 252. The stators 251 each include a core 251a and a coil 251b wound around the core 251a. The linear motor stator 5f is formed by arranging the stators 251 as unit electromagnets in a row in the X direction. The core 251a is an iron core extending along a direction (Y direction) in which the magnetic sensors 152 and the magnetic scale 4d face each other. The holder 252 holds the core 251a and the coil 251b. The holder 252 is attached to the upper wall 51 of the support member 5b. The holder 252 accommodates a plurality of stators 251 aligned in the X direction.

The linear conveyor 101 as described above includes a linear motor, a linear guide, and a linear scale. The linear motor includes the linear motor mover 4b and the linear motor stator 5f. The linear guide includes the guide rails 5e and the guide blocks 4c. The linear scale includes the magnetic sensor units 5d and the magnetic scale 4d.

In the linear motor, due to interaction between magnetic flux generated in the coils 251b when a current of any of a U phase, a V phase, and a W phase having different phases is supplied to the linear motor stator 5f and the magnetic flux of the permanent magnets 4h of the linear motor mover 4b, a magnetic propulsion force is generated. That is, the slider 4 can be moved in the X1 direction or the X2 direction by the propulsion force described above.

Figure 6:
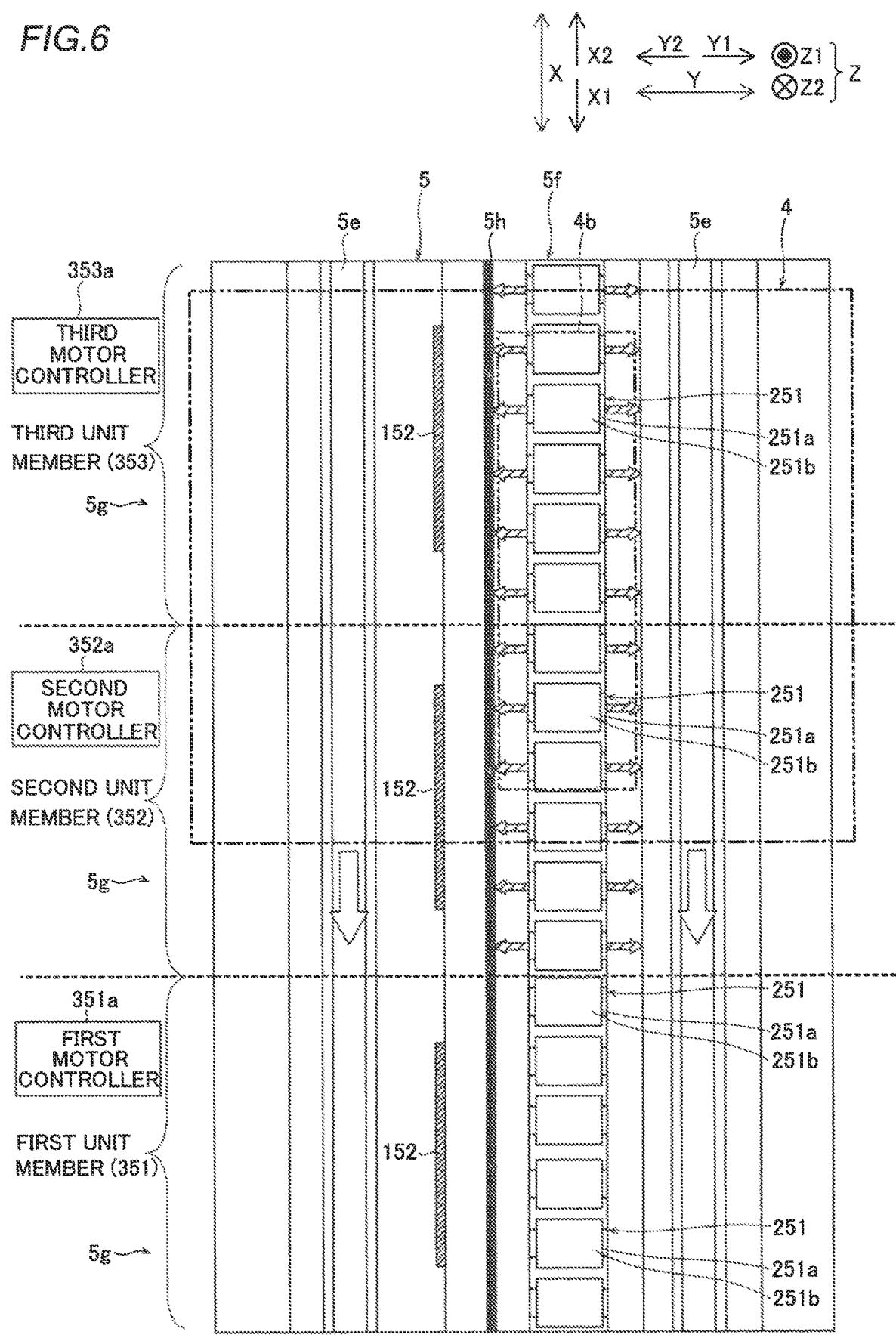
FIG. 6 is a plan view showing the linear conveyor module of the linear conveyor according to the first embodiment from which the cover member has been removed, as viewed from the Z1 direction side.

As shown in FIG. 6, the unit members 5g each define one control section in a control system of the linear conveyor 101. That is, the unit members 5g are provided by dividing a plurality of (eighteen) stators 251 for each control section, and are separately controlled to be energized. Specifically, the unit members 5g each control a current supplied to a plurality of (six) stators 251 assigned to each control section. One control section is an example of a "predetermined section" in the claims. The number of stators 251 may be two to seventeen or nineteen or more. The number of stators 251 assigned to each control section may be two to five or seven or more.

A plurality of (three) such unit members 5g are aligned in the X direction in the linear conveyor module 5. A unit member 5g arranged on the most X1 direction side among the plurality of unit members 5g is defined as a first unit member 351, a unit member 5g adjacent to the X2 direction side of the first unit member 351 is defined as a second unit member 352, and a unit member 5g adjacent to the X2 direction side of the second unit member 352 is defined as a third unit member 353. The number of unit members 5g may be two or four or more.

Specifically, the first unit member 351 includes the magnetic sensors 152 described above, the plurality of (six) stators 251 described above, and a motor controller (hereinafter referred to as a first motor controller 351a). Similarly, the second unit member 352 includes the magnetic sensors 152 described above, the plurality of (six) stators 251 described above, and a motor controller (hereinafter referred to as a second motor controller 352a). Similarly, the third unit member 353 includes the magnetic sensors 152 described above, the plurality of (six) stators 251 described above, and a motor controller (hereinafter referred to as a third motor controller 353a).

The linear conveyor 101 controls movement and stoppage of the slider 4 with the first motor controller 351a, the second motor controller 352a, and the third motor controller 353a based on the position of the slider 4. Specifically, the linear conveyor 101 controls all currents of the plurality of stators 251 of the unit members 5g while synchronizing the plurality of unit members 5g based on the magnetic sensors 152 of each of the plurality of unit members 5g detecting the magnetic scale 4d during movement of the slider 4.

Thus, for example, as shown in FIG. 6, when the slider 4 is located across the second unit member 352 and the third unit member 353, all currents of the plurality of stators 251 of the second unit member 352 are controlled, and all currents of the plurality of stators 251 of the third unit member 353 are controlled. At this time, magnetic flux is emitted from the stators 251, as indicated by hatched arrows. Of the magnetic flux emitted from the stators 251, the magnetic flux of a portion in which the linear motor mover 4b is located acts on the permanent magnets 4h of the linear motor mover 4b. That is, the magnetic flux of the portion in which the linear motor mover 4b is located is drawn to the permanent magnets 4h having a polarity opposite to a polarity on the stator 251 side due to the polarity of the permanent magnets 4h, but the magnetic flux not drawn to the permanent magnets 4h is finally drawn to the back yoke 4g. On the other hand, of the magnetic flux emitted from the stators 251, the magnetic flux outside the linear motor mover 4b is released without acting on the linear motor mover 4b.

Magnetic Shielding Member

The magnetic shielding member 5h according to this embodiment is a member that significantly reduces or prevents the magnetic influence of the magnetic flux released without acting on the linear motor mover 4b, on the magnetic sensors 152. That is, the magnetic shielding member 5h is provided between the magnetic sensors 152 and the linear motor stator 5f to shield the magnetic flux from the linear motor stator 5f toward the magnetic sensors 152. The magnetic shielding member 5h is also arranged between the cores 251a and both the magnetic sensors 152 and the magnetic scale 4d in the direction (Y direction) in which the magnetic sensors 152 and the magnetic scale 4d face each other. Thus, the magnetic shielding member 5h is a member that also significantly reduces or prevents the magnetic influence of the magnetic flux released without acting on the linear motor mover 4b, on the magnetic scale 4d. Thus, the linear motor stator 5f, the magnetic shielding member 5h, and the magnetic sensors 152 are arranged side by side in the Y direction.

Figure 7:
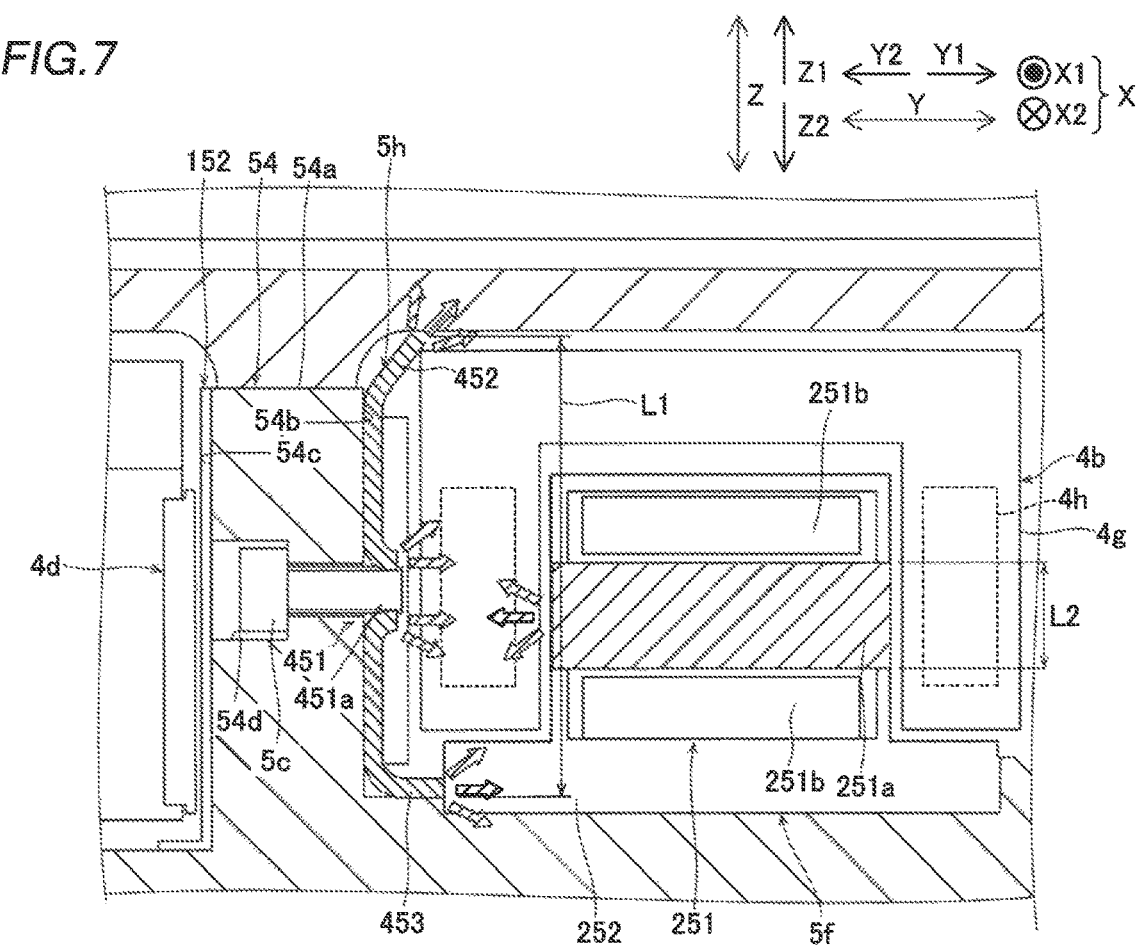
FIG. 7 is a partial sectional view showing the linear conveyor module of the linear conveyor according to the first embodiment in the vicinity of a magnetic shielding member.
Figure 8:
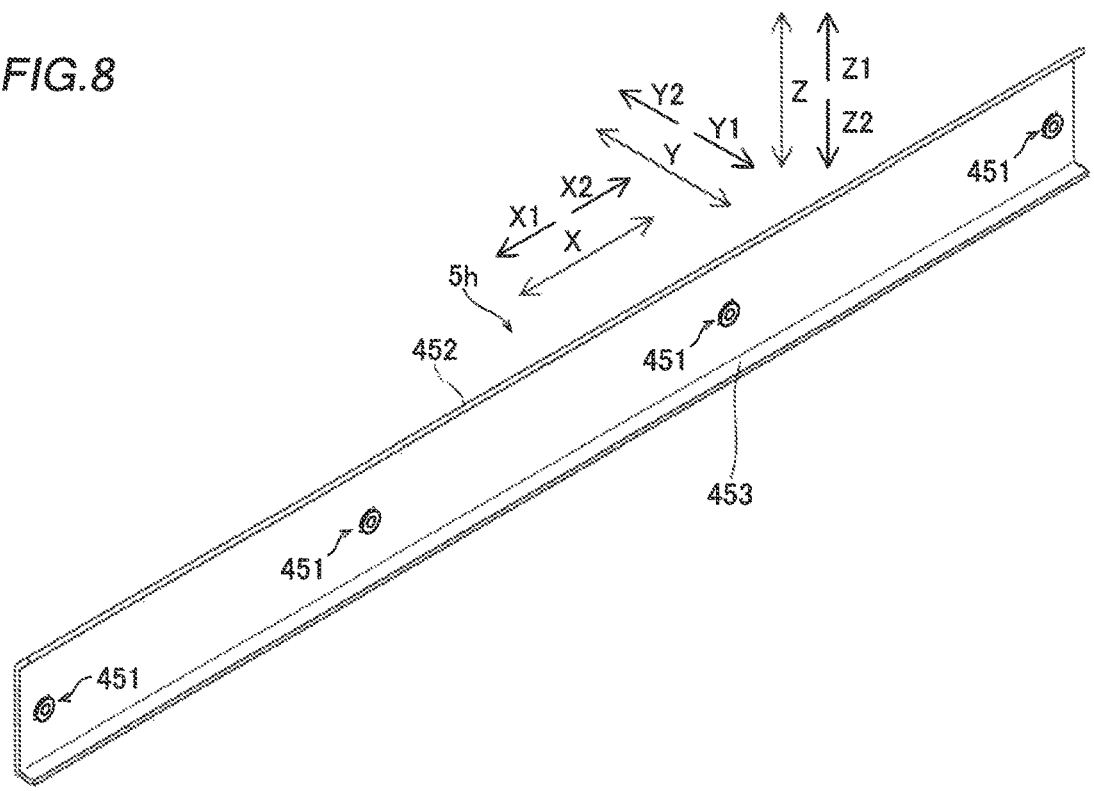
FIG. 8 is a perspective view showing the magnetic shielding member of the linear conveyor according to the first embodiment.

Specifically, as shown in FIGS. 7 and 8, the magnetic shielding member 5h shields the magnetic flux from the linear motor stator 5f toward the magnetic sensors 152 by drawing in the magnetic flux emitted from the linear motor stator 5f. That is, the magnetic shielding member 5h is magnetized by the magnetic flux from the linear motor stator 5f toward the magnetic sensors 152. The magnetic shielding member 5h is made of a magnetic material. Specifically, the magnetic shielding member 5h as a magnetic material is made of iron or steel.

The magnetic shielding member 5h has a plate shape extending along the X direction. Specifically, the magnetic shielding member 5h has a thin plate shape having a thickness in the Y direction. The cross-sectional shape (the shape of the cross-section along a plane orthogonal to the X direction) of the magnetic shielding member 5h along the Y direction has a substantially C-shape bent toward the linear motor stator 5f.

The plate-shaped magnetic shielding member 5h is sized to cover at least the cores 251a of the stators 251 in the Y direction. That is, the plate-shaped magnetic shielding member 5h and the cores 251a of the stators 251 overlap each other as viewed from the Y1 direction side (see FIG. 5). Specifically, in the Z direction, the length L1 of the plate-shaped magnetic shielding member 5h is larger than the length L2 of each of the cores 251a. In the Z direction, the stators 251 are arranged between the upper end (end on the Z1 direction side) and the lower end (end on the Z2 direction side) of the plate-shaped magnetic shielding member 5*h*. That is, in the Z direction, at least the cores 251*a* are arranged between the upper end and the lower end of the plate-shaped magnetic shielding member 5*h*. Furthermore, in the Z direction, main portions of the plurality of magnetic sensors 152 aligned in the Z direction are arranged between the upper end and the lower end of the plate-shaped magnetic shielding member 5*h*. Moreover, in the Z direction, a main portion of the scale substrate 41 of the magnetic scale 4*d* is arranged between the upper end and the lower end of the plate-shaped magnetic shielding member 5*h*.

As shown in FIGS. 8 and 9, in the X direction, the plate-shaped magnetic shielding member 5*h* extends outward beyond the core 251*a* of the stator 251 arranged at an end S among the plurality of stators 251. Specifically, in the X direction, an end S1 (first-side end S1) of the magnetic shielding member 5*h* on the X1 direction side extends in the X1 direction beyond the core 251*a* of the stator 251 arranged at the first side end S1 among the plurality of stators 251. An end S2 (second-side end S2) of the magnetic shielding member 5*h* on the X2 direction side extends in the X2 direction beyond the core 251*a* of the stator 251 arranged at the second-side end S2 among the plurality of stators 251. That is, the first-side end S1 of the magnetic shielding member 5*h* is located in the vicinity of an end E1 of the linear conveyor module 5 on the X1 direction side. The second-side end S2 of the magnetic shielding member 5*h* is located in the vicinity of an end E2 of the linear conveyor module 5 on the X2 direction side.

Thus, in the X direction, the plate-shaped magnetic shielding member 5*h* extends from the end E1 of the linear conveyor module 5 on the X1 direction side to substantially the entire end E2 on the X2 direction side. That is, the magnetic shielding member 5*h* is arranged between the magnetic sensors 152 and the stators 251 over all of the plurality of unit members 5*g*. Specifically, the magnetic shielding member 5*h* is a single plate extending uninterrupted from the vicinity of the end E1 of the linear conveyor module 5 on the X1 direction side to the vicinity of the end E2 of the linear conveyor module 5 on the X2 direction side.

As shown in FIGS. 7 and 8, the magnetic shielding member 5*h* includes insertion holes 451 into which the fastening members 5*c* are inserted. Female threaded portions into which male threaded portions of the fastening members 5*c* are screwed are formed in portions of the insertion holes 451 on the linear motor stator 5*f* side. The insertion holes 451 are formed by subjecting the plate-shaped magnetic shielding member 5*h* to a burring process. Therefore, the insertion holes 451 each have a shape protruding toward the linear motor stator 5*f* in the Y direction. Specifically, edges of the insertion holes 451 on the linear motor stator 5*f* side include insertion hole bent portions 451*a* bent toward the linear motor stator 5*f*. The insertion hole bent portions 451*a* each have a circular shape as viewed from the Y1 direction side. The insertion hole bent portions 451*a* are curved toward the center sides of the insertion holes 451 toward the linear motor stator 5*f* in the Y direction.

The magnetic shielding member 5*h* changes the direction of the magnetic flux emitted from the linear motor stator 5*f* toward the magnetic sensors 152. That is, the magnetic shielding member 5*h* draws in the magnetic flux emitted from the linear motor stator 5*f* toward the magnetic sensors 152 and releases the magnetic flux to the linear motor stator 5*f* side.

Specifically, the magnetic shielding member 5*h* includes an upper bent portion 452 and a lower bent portion 453. The upper bent portion 452 is an example of a "first bent portion" in the claims. The lower bent portion 453 is an example of a "second bent portion" in the claims.

The upper bent portion 452 is bent such that the upper end of the magnetic shielding member 5*h* is directed to the linear motor stator 5*f* side. The upper bent portion 452 is inclined to the Z1 direction side toward the linear motor stator 5*f* in the Y direction. The magnetic shielding member 5*h* is bent in order to form the upper bent portion 452. The lower bent portion 453 is bent such that the lower end of the magnetic shielding member 5*h* is directed to the linear motor stator 5*f* side. The lower bent portion 453 extends along the Y direction. The magnetic shielding member 5*h* is bent in order to form the lower bent portion 453.

Thus, the magnetic shielding member 5*h* is bent in order to form the upper bent portion 452 and the lower bent portion 453, but a surface of the magnetic shielding member 5*h* on the magnetic sensor 152 side has a rounded shape (a rounded and smooth shape) instead of a corner in the upper bent portion 452 and the lower bent portion 453.

Advantageous Effects of First Embodiment

According to the first embodiment, the following advantageous effects are achieved.

According to the first embodiment, as described above, the linear conveyor 101 includes the magnetic shielding member 5*h* arranged between the magnetic sensors 152 and the linear motor stator 5*f* and configured to shield the magnetic flux from the linear motor stator 5*f* toward the magnetic sensors 152. Accordingly, the magnetic flux emitted from the linear motor stator 5*f* is shielded by the magnetic shielding member 5*h* such that it is possible to significantly reduce or prevent erroneous detection of the magnetic sensors 152 due to the magnetic flux emitted from the linear motor stator 5*f*. Therefore, it is not necessary to arrange the magnetic sensors 152 and the linear motor stator 5*f* such that the direction of the magnetic flux emitted from the linear motor stator 5*f* and the direction of the magnetic flux detected by the magnetic sensors 152 are different from each other, and it is not necessary to increase a distance between the magnetic sensors 152 and the linear motor stator 5*f*. Thus, the magnetic shielding member 5*h* can improve the degree of freedom of the arrangement positions of the magnetic sensors 152 and the linear motor stator 5*f*. Consequently, the size of the linear conveyor 101 can be reduced by improving the degree of freedom of the arrangement positions of the magnetic sensors 152 and the linear motor stator 5*f* while significantly reducing or preventing erroneous detection of magnetic flux by the magnetic sensors 152.

According to the first embodiment, as described above, the magnetic shielding member 5*h* is configured to shield the magnetic flux from the linear motor stator 5*f* toward the magnetic sensors 152 by drawing in the magnetic flux emitted from the linear motor stator 5*f*. Accordingly, the magnetic flux from the linear motor stator 5*f* toward the magnetic sensors 152 is drawn by the magnetic shielding member 5*h* such that it is possible to make it difficult for the magnetic flux to reach the magnetic sensors 152, and thus the accuracy of detecting the position of the slider 4 by the magnetic sensors 152 can be ensured.

According to the first embodiment, as described above, the magnetic shielding member 5*h* has a plate shape extending along the X direction. Accordingly, the magnetic flux emitted from the linear motor stator 5f can be shielded in the X direction, and thus it is possible to make it difficult for the magnetic flux emitted from the linear motor stator 5f to reach the magnetic sensors 152. Furthermore, the magnetic shielding member 5h has a plate shape extending along the X direction such that the thickness of the magnetic shielding member 5h in the Y direction can be reduced as compared with a case in which the magnetic shielding member 5h has a block shape, and thus it is possible to significantly reduce or prevent an increase in the size of the linear conveyor 101 in the Y direction.

According to the first embodiment, as described above, the linear motor stator 5f, the magnetic shielding member 5h, and the magnetic sensors 152 are arranged side by side along the Y direction. Furthermore, the cores 251a extend along the Y direction. Moreover, the plate-shaped magnetic shielding member 5h is sized to cover at least the cores 251a of the stators 251 in the Y direction. Accordingly, at least locations (the cores 251a of the stators 251) at which the magnetic flux is most emitted can be covered by the magnetic shielding member 5h, and thus the magnetic flux emitted from the linear motor stator 5f can be effectively shielded by the magnetic shielding member 5h.

According to the first embodiment, as described above, in the Z direction, the length of the plate-shaped magnetic shielding member 5h is larger than the length of each of the cores 251a. Accordingly, a wider range in the Z direction than the cores 251a can be covered by the magnetic shielding member 5h, and thus it is possible to more reliably shield the magnetic flux heading toward the magnetic sensors 152 while spreading from the linear motor stator 5f.

According to the first embodiment, as described above, the plate-shaped magnetic shielding member 5h extends outward beyond the core 251a of the stator 251 arranged at the end among the plurality of stators 251. Accordingly, the cores 251a of the plurality of stators 251 arranged side by side along the X direction can be covered, and thus the magnetic flux emitted from the linear motor stator 5f to the magnetic shielding member 5h can be effectively shielded.

According to the first embodiment, as described above, in the X direction, the first-side end S1 of the magnetic shielding member 5h extends to the first side beyond the core 251a of the stator 251 arranged at the first-side end S1 among the plurality of stators 251. Furthermore, in the X direction, the second-side end S2 of the magnetic shielding member 5h extends to the second side beyond the core 251a of the stator 251 arranged at the second-side end S2 among the plurality of stators 251. Accordingly, the cores 251a of the plurality of stators 251 arranged side by side along the X direction can be covered from the first-side end S1 to the second-side end S2 in the X direction by the magnetic shielding member 5h, and thus the magnetic flux from the linear motor stator 5f toward the magnetic sensors 152 can be more reliably shielded.

According to the first embodiment, as described above, the magnetic shielding member 5h includes the insertion holes 451 into which the fastening members 5c are inserted. Furthermore, the insertion hole bent portions 451a bent toward the linear motor stator 5f are provided at the edges of the insertion holes 451 on the linear motor stator 5f side. Accordingly, the magnetic flux shielded by the magnetic shielding member 5h and released from the edges of the insertion holes 451 can be released to the linear motor stator 5f side along the insertion hole bent portions 451a, and thus it is possible to make it difficult for the magnetic flux released from the magnetic shielding member 5h to reach the magnetic sensors 152.

According to the first embodiment, as described above, the fastening members 5c are made of a non-magnetic material. Accordingly, unlike a case in which the fastening members 5c are made of a magnetic material, the fastening members 5c are not magnetized, and thus it is possible to significantly reduce or prevent the possibility that magnetic flux emitted from the fastening members 5c due to magnetization of the fastening members 5c caused by the magnetic flux emitted from the linear motor stator 5f reaches the magnetic sensors 152. Consequently, it is possible to make it difficult for the magnetic flux emitted from the linear motor stator 5f to reach the magnetic sensors 152.

According to the first embodiment, as described above, the magnetic shielding member 5h is configured to draw in the magnetic flux emitted from the linear motor stator 5f toward the magnetic sensors 152 and to release the magnetic flux to the linear motor stator 5f side. Accordingly, the magnetic flux drawn into the magnetic shielding member 5h can be released to the side (linear motor stator 5f side) opposite to the magnetic sensor 152 side, and thus it is possible to make it difficult for the magnetic flux released from the magnetic shielding member 5h to reach the magnetic sensors 152.

According to the first embodiment, as described above, in the Z direction, the magnetic shielding member 5h includes the upper bent portion 452 bent such that the upper end is directed to the linear motor stator 5f side, and the lower bent portion 453 bent such that the lower end is directed to the linear motor stator 5f side. Accordingly, the magnetic flux drawn into the magnetic shielding member 5h can be released to locations away from the magnetic sensors 152 by the upper bent portion 452 and the lower bent portion 453. Furthermore, the upper bent portion 452 and the lower bent portion 453 are provided such that it is possible to significantly reduce or prevent an increase in the size of the magnetic shielding member 5h in the upward-downward direction as compared with a magnetic shielding member 5h including an upper end and a lower end straightened (not bent) along the upward-downward direction. Consequently, it is possible to make it difficult for the magnetic flux released from the magnetic shielding member 5h to reach the magnetic sensors 152 and to significantly reduce or prevent an increase in the size of the linear conveyor 101 in the Z direction.

According to the first embodiment, as described above, the slider 4 includes the magnetic scale 4d facing the magnetic sensors 152 and configured to emit magnetic flux detected by the magnetic sensors 152. Furthermore, the magnetic shielding member 5h is arranged between the cores 251a and both the magnetic sensors 152 and the magnetic scale 4d in the Y direction. Accordingly, the magnetic flux from the linear motor stator 5f toward the magnetic scale 4d is shielded by the magnetic shielding member 5h such that it is possible to make it difficult for the magnetic flux to reach the magnetic scale 4d, and thus the magnetic scale 4d can be protected from the magnetic flux emitted from the linear motor stator 5f.

According to the first embodiment, as described above, the support member 5b includes the mounting wall 54 provided between the magnetic sensors 152 and the linear motor stator 5f and protruding in the Z1 direction. Furthermore, the magnetic sensors 152 are attached to the sensor-side side surface 54c of the mounting wall 54 on the side opposite to the linear motor stator 5f side. Moreover, the magnetic shielding member 5h is attached to the motor-side side surface 54b on the linear motor stator 5f side of the mounting wall 54 common to the magnetic sensors 152.

Accordingly, the magnetic sensors 152 and the magnetic shielding member 5h are attached to the common mounting wall 54 such that it is possible to significantly reduce or prevent the complexity of the structure of the support member 5b and an increase in the size of the support member 5b, and thus it is possible to significantly reduce or prevent the complexity of the structure of the linear conveyor 101 and an increase in the size of the linear conveyor 101.

According to the first embodiment, as described above, the linear conveyor 101 includes the plurality of unit members 5g provided by dividing the plurality of stators 251 for each control section and separately controlled to be energized. Furthermore, the magnetic shielding member 5h is arranged between the magnetic sensors 152 and the stators 251 over all of the plurality of unit members 5g. Accordingly, even when the energization control is performed over two or more unit members 5g and magnetic flux is emitted from the stators 251, the magnetic flux can be reliably shielded by the magnetic shielding member 5h, and thus the accuracy of position detection of the magnetic sensors 152 can be ensured.

According to the first embodiment, as described above, the magnetic shielding member 5h is made of a magnetic material. Accordingly, the magnetic shielding member 5h is magnetized by the magnetic flux from the linear motor stator 5f toward the magnetic sensors 152 such that the magnetic flux from the linear motor stator 5f toward the magnetic sensors 152 can be drawn by the magnetic shielding member 5h. Consequently, it is possible to make it difficult for the magnetic flux to reach the magnetic sensors 152, and thus the accuracy of detecting the position of the slider 4 by the magnetic sensors 152 can be ensured.

According to the first embodiment, as described above, the magnetic shielding member 5h as a magnetic material is made of iron or steel. Accordingly, the magnetic shielding member 5h can be easily magnetized by the magnetic flux from the linear motor stator 5f toward the magnetic sensors 152, and thus the magnetic flux from the linear motor stator 5f toward the magnetic sensors 152 can be reliably drawn by the magnetic shielding member 5h.

Second Embodiment

A linear conveyor 501 according to a second embodiment is now described with reference to FIGS. 10 and 11. Specifically, the linear conveyor 501 according to the second embodiment includes bent portions at both ends of a magnetic shielding member 505h in an X direction, unlike the linear conveyor 101 according to the first embodiment described above in which no bent portions are provided at both ends of the magnetic shielding member 5h in the X direction. In the second embodiment, the same or similar configurations as those of the first embodiment are denoted by the same reference numerals, and description thereof is omitted.

Figure 10:
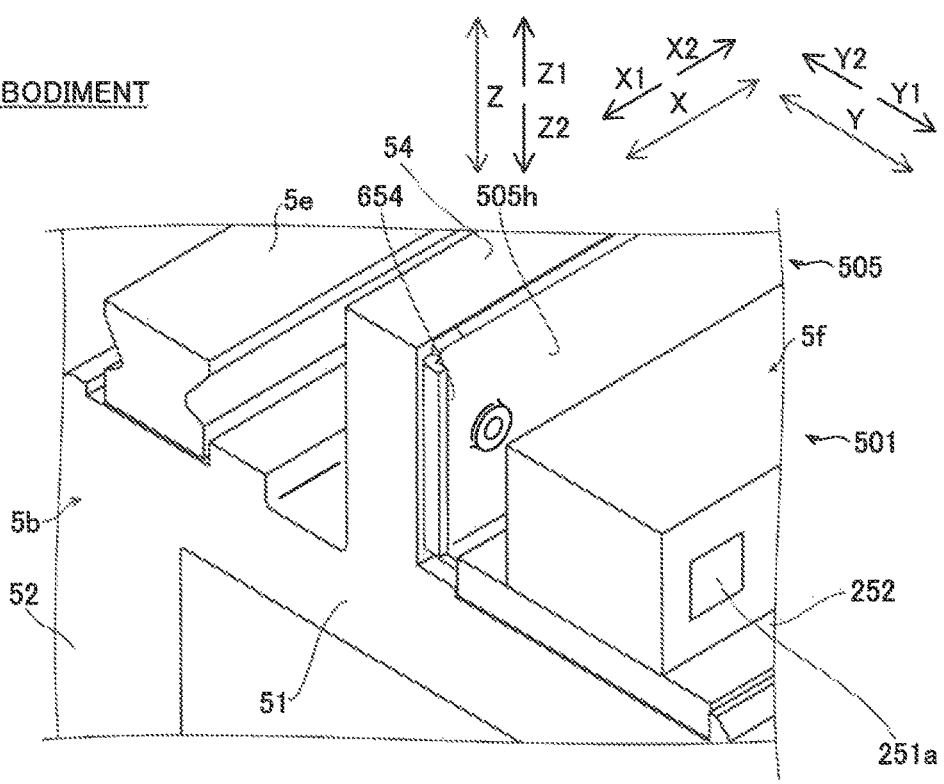
FIG. 10 is a partial sectional view showing a linear conveyor module of a linear conveyor according to a second embodiment in the vicinity of the X1 direction side.
Figure 11:
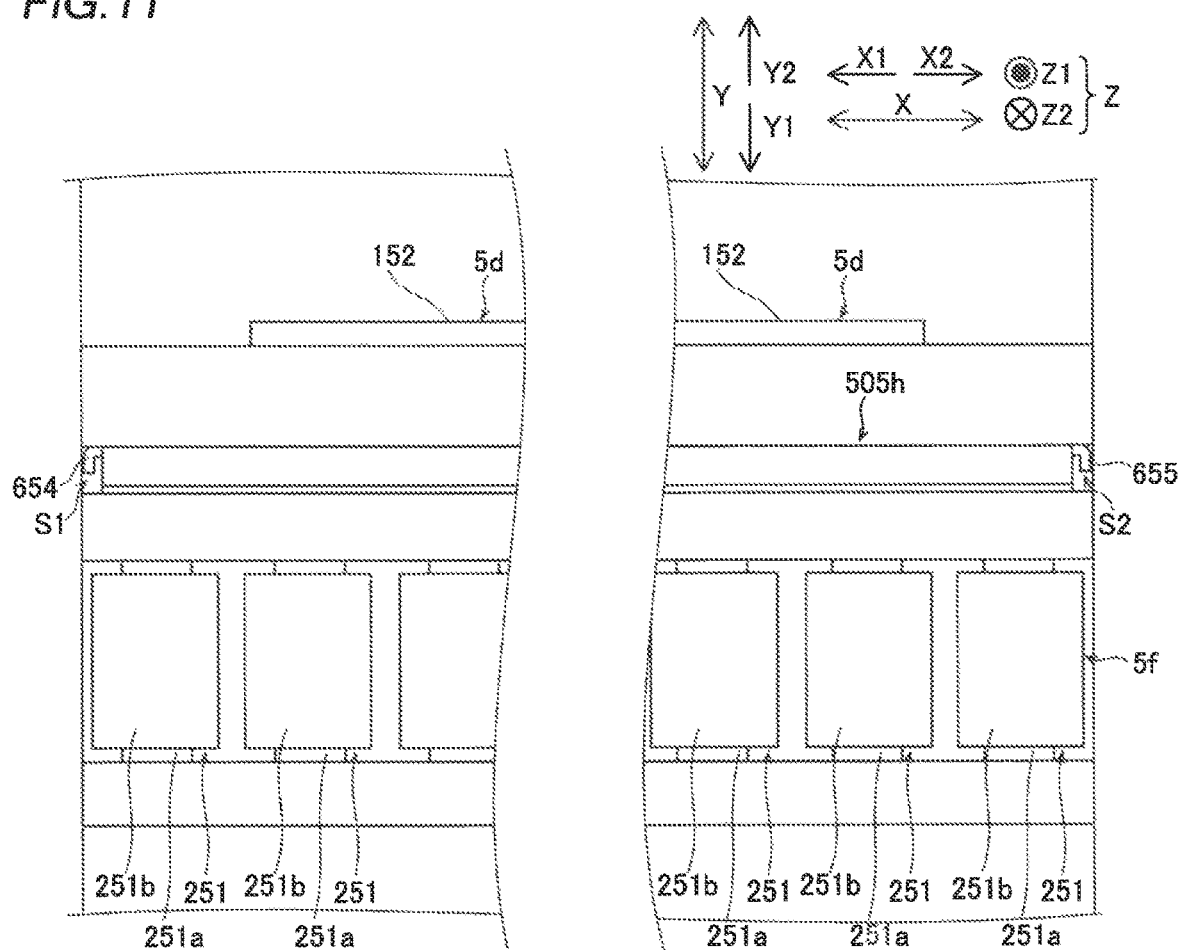
FIG. 11 is a plan view showing an end on the X1 direction side and an end on the X2 direction side of the linear conveyor module of the linear conveyor according to the second embodiment from which a cover member has been removed, as viewed from the Z1 direction side.

As shown in FIGS. 10 and 11, linear conveyor modules 505 of the linear conveyor 501 according to the second embodiment each includes a cover member 5a (see FIG. 3), a support member 5b, fastening members 5c (not shown), magnetic sensor units 5d, guide rails 5e, a linear motor stator 5f, unit members 5g (see FIG. 6), and the magnetic shielding member 505h.

Magnetic Shielding Member

The magnetic shielding member 505h according to the second embodiment draws in magnetic flux emitted from the linear motor stator 5f toward magnetic sensors 152 and releases the magnetic flux to the linear motor stator 5f side.

Specifically, the magnetic shielding member 505h includes a first-side bent portion 654 and a second-side bent portion 655. The first-side bent portion 654 is provided at an end of the plate-shaped magnetic shielding member 505h on the X1 direction side. The first-side bent portion 654 is bent such that the end (first-side end S1) on the X1 direction side in the X direction is directed to the linear motor stator 5f side. The second-side bent portion 655 is bent such that the end (the second-side end S2) on the X2 direction side in the X direction is directed to the linear motor stator 5f side. Thus, the magnetic shielding member 505h can release both the magnetic flux released from the end on the X1 direction side in the X direction and the magnetic flux released from the end on the X2 direction side in the X direction to the linear motor stator 5f side. The remaining configurations of the second embodiment are similar to the configurations of the first embodiment.

Advantageous Effects of Second Embodiment

According to the second embodiment, the following advantageous effects are achieved.

According to the second embodiment, as described above, the linear conveyor 501 includes the magnetic shielding member 505h arranged between the magnetic sensors 152 and the linear motor stator 5f and configured to shield the magnetic flux from the linear motor stator 5f toward the magnetic sensors 152. Accordingly, the size of the linear conveyor 101 can be reduced by improving the degree of freedom of the arrangement positions of the magnetic sensors 152 and the linear motor stator 5f while significantly reducing or preventing erroneous detection of magnetic flux by the magnetic sensors 152.

According to the second embodiment, as described above, the magnetic shielding member 505h includes the first-side bent portion 654 bent such that the first-side end S1 in the X direction is directed to the linear motor stator 5f side. Furthermore, the magnetic shielding member 505h includes the second-side bent portion 655 bent such that the second-side end S2 in the X direction is directed to the linear motor stator 5f side. Accordingly, the magnetic flux drawn into the magnetic shielding member 505h can be released to the side (linear motor stator 5f side) opposite to the magnetic sensor 152 side by the first-side bent portion 654 and the second-side bent portion 655. Furthermore, the first-side bent portion 654 and the second-side bent portion 655 are provided such that an increase in the size of the magnetic shielding member 505h in the X direction can be significantly reduced or prevented as compared with a magnetic shielding member 505h including a first-side end and a second-side end straightened (not bent) along the X direction. Consequently, it is possible to make it difficult for the magnetic flux released from the magnetic shielding member 505h to reach the magnetic sensors 152 and to significantly reduce or prevent an increase in the size of the linear conveyor 101 in the X direction. The remaining advantageous effects of the second embodiment are similar to the advantageous effects of the first embodiment.

MODIFIED EXAMPLES

The embodiments disclosed this time must be considered as illustrative in all points and not restrictive. The scope of the present disclosure is not shown by the above description of the embodiments but by the scope of claims for patent, and all modifications (modified examples) within the meaning and scope equivalent to the scope of claims for patent are further included.

For example, while the example in which the fastening members 5c are made of austenitic stainless steel has been shown in each of the aforementioned first and second embodiments, the present disclosure is not restricted to this. In the present disclosure, the fastening members may be made of another non-magnetic metal.

While the example in which the magnetic shielding member 5h (505h) as a magnetic material is made of iron or steel has been shown in each of the aforementioned first and second embodiments, the present disclosure is not restricted to this. In the present disclosure, the magnetic shielding member may be made of a metal material that is another magnetic material.

While the example in which the magnetic shielding member 5h (505h) includes the upper bent portion 452 (first bent portion) and the lower bent portion 453 (second bent portion) has been shown in each of the aforementioned first and second embodiments, the present disclosure is not restricted to this. In the present disclosure, the magnetic shielding member may not include both the first bent portion and the second bent portion, or may not have any one of the first bent portion and the second bent portion.

While the example in which the magnetic shielding member 505h includes both the first-side bent portion 654 and the second-side bent portion 655 has been shown in the aforementioned second embodiment, the present disclosure is not restricted to this. In the present disclosure, the magnetic shielding member may not include both the first-side bent portion and the second-side bent portion, or may include any one of the first-side bent portion and the second-side bent portion.

While the example in which the magnetic shielding member 5h (505h) has a plate shape extending along the X direction (the direction in which the guide rails 5e extend) has been shown in each of the aforementioned first and second embodiments, the present disclosure is not restricted to this. In the present disclosure, the magnetic shielding member may have a block shape, for example.

While the example in which the magnetic shielding member 5h (505h) shields the magnetic flux from the linear motor stator 5f toward the magnetic sensors 152 by drawing in the magnetic flux emitted from the linear motor stator 5f has been shown in each of the aforementioned first and second embodiments, the present disclosure is not restricted to this. In the present disclosure, the magnetic shielding member may shield the magnetic flux from the linear motor stator toward the magnetic sensors by reflecting the magnetic flux emitted from the linear motor stator.

While the example in which the magnetic shielding member 5h (505h) is attached to the side surface on the linear motor stator 5f side of the mounting wall 54 common to the magnetic sensors 152 has been shown in each of the aforementioned first and second embodiments, the present disclosure is not restricted to this. In the present disclosure, the magnetic shielding member may be attached to a location different from the magnetic sensors.

While the example in which the plurality of linear conveyor modules 5 having the same length in the X direction are aligned in the X direction has been shown in each of the aforementioned first and second embodiments, the present disclosure is not restricted to this. In the present disclosure, the linear conveyor modules having different lengths in the X direction may be aligned in the X direction.

While the example in which the magnetic shielding member 5h (505h) is a single plate extending uninterrupted from the vicinity of the end E1 of the linear conveyor module 5 (505) on the X1 direction side to the vicinity of the end E2 of the linear conveyor module 5 (505) on the X2 direction side has been shown in each of the aforementioned first and second embodiments, the present disclosure is not restricted to this. In the present disclosure, the magnetic shielding member may be divided into a plurality of portions.

While the example in which the magnetic shielding member 5h (505h) is attached to the support member 5b by the fastening members 5c has been shown in each of the aforementioned first and second embodiments, the present disclosure is not restricted to this. In the present disclosure, the magnetic shielding member may be attached to the support member by an adhesive or the like.

While the example in which the fastening members 5c are arranged in the central portion of the mounting wall 54 in the Z direction (upward-downward direction) has been shown in each of the aforementioned first and second embodiments, the present disclosure is not restricted to this. In the present disclosure, the fastening members may be arranged above or below the central portion of the mounting wall in the upward-downward direction.

While the example in which the magnetic sensors 152 are attached to the sensor-side side surface 54c, and the magnetic shielding member 5h (505) is attached to the motor-side side surface 54b of the mounting wall 54 common to the magnetic sensors 152 has been shown in each of the aforementioned first and second embodiments, the present disclosure is not restricted to this. In the present disclosure, the magnetic sensors may be attached directly to a surface of the magnetic shielding member opposite to the linear motor stator.

What is claimed is:
1. A linear conveyor comprising:
    a linear motor stator including at least one stator including a core and a coil wound around the core;
    a slider including a linear motor mover including a permanent magnet;
    a guide rail configured to guide movement of the slider;
    a magnetic sensor configured to detect a position of the slider;
    a magnetic shield between the magnetic sensor and the linear motor stator and configured to shield magnetic flux from the linear motor stator toward the magnetic sensor; and
    a fastener configured to attach the magnetic shield;
    wherein
    the magnetic shield includes an insertion hole into which the fastener is inserted; and
    the insertion hole includes, at an edge thereof on a linear motor stator side, an insertion hole bent portion bent toward the linear motor stator.

2. The linear conveyor according to claim 1, wherein the magnetic shield is configured to shield the magnetic flux from the linear motor stator toward the magnetic sensor by drawing in magnetic flux emitted from the linear motor stator.

3. The linear conveyor according to claim 1, wherein the magnetic shield has a plate shape extending along a direction in which the guide rail extends.

4. The linear conveyor according to claim 3, wherein the linear motor stator, the magnetic shield, and the magnetic sensor are side by side along a width direction of the guide rail orthogonal to the direction in which the guide rail extends;
the core extends along the width direction of the guide rail; and
the magnetic shield having the plate shape is sized to cover at least the core of the stator as viewed from the width direction of the guide rail.

5. The linear conveyor according to claim 4, wherein in a direction orthogonal to the direction in which the guide rail extends and the width direction of the guide rail, the magnetic shield having the plate shape has a length larger than a length of the core.

6. The linear conveyor according to claim 4, wherein
the stator includes a plurality of stators side by side along the direction in which the guide rail extends; and
in the direction in which the guide rail extends, the magnetic shield having the plate shape extends outward beyond the core of the stator at an end among the plurality of stators.

7. The linear conveyor according to claim 6, wherein the magnetic shield includes a first-side end extending to a first side in the direction in which the guide rail extends beyond the core of the stator at a first-side end among the plurality of stators, and a second-side end extending to a second side in the direction in which the guide rail extends beyond the core of the stator at a second-side end among the plurality of stators.

8. The linear conveyor according to claim 1, wherein the fastener is made of a non-magnetic material.

9. The linear conveyor according to claim 1, wherein the magnetic shield is configured to draw in magnetic flux emitted from the linear motor stator toward the magnetic sensor and to release the magnetic flux to a linear motor stator side.

10. The linear conveyor according to claim 9, wherein in a direction orthogonal to a direction in which the guide rail extends and a width direction of the guide rail orthogonal to the direction in which the guide rail extends, the magnetic shield includes at least one of a first bent portion bent such that a first end is directed to the linear motor stator side or a second bent portion bent such that a second end is directed to the linear motor stator side.

11. The linear conveyor according to claim 9, wherein the magnetic shield includes at least one of a first-side bent portion bent such that a first-side end in a direction in which the guide rail extends is directed to the linear motor stator side or a second-side bent portion bent such that a second-side end in the direction in which the guide rail extends is directed to the linear motor stator side.

12. The linear conveyor according to claim 1, wherein
the slider further includes a magnetic scale facing the magnetic sensor and configured to emit magnetic flux detected by the magnetic sensor;
the core of the stator extends along a direction in which the magnetic sensor and the magnetic scale face each other; and
the magnetic shield is between the core and both the magnetic sensor and the magnetic scale in the direction in which the magnetic sensor and the magnetic scale face each other.

13. The linear conveyor according to claim 1, further comprising:
a support configured to support the linear motor stator and the guide rail; wherein the support includes a mounting wall provided between the magnetic sensor and the linear motor stator and protruding upward;
the magnetic sensor is attached to a side surface of the mounting wall on a side opposite to a linear motor stator side; and
the magnetic shield is attached to a side surface on the linear motor stator side of the mounting wall common to the magnetic sensor.

14. The linear conveyor according to claim 1, wherein
the at least one stator includes a plurality of stators side by side along a direction in which the guide rail extends;
the linear conveyor further comprises a plurality of unit members configured by dividing the plurality of stators for each predetermined section and separately controlled to be energized;
each of the plurality of unit members includes the magnetic sensor; and
the magnetic shield is between the magnetic sensor and the stator over all of the plurality of unit members.

15. The linear conveyor according to claim 1, wherein the magnetic shield includes a magnetic material.

16. The linear conveyor according to claim 15, wherein the magnetic material is iron or steel.

17. A linear conveyor comprising:
a linear motor stator including at least one stator including a core and a coil wound around the core;
a slider including a linear motor mover including a permanent magnet;
a guide rail configured to guide movement of the slider;
a magnetic sensor configured to detect a position of the slider; and
a magnetic shield between the magnetic sensor and the linear motor stator and configured to shield magnetic flux from the linear motor stator toward the magnetic sensor; wherein
the slider further includes a magnetic scale facing the magnetic sensor and configured to emit magnetic flux detected by the magnetic sensor;
the core of the stator extends along a direction in which the magnetic sensor and the magnetic scale face each other; and
the magnetic shield is between the core and both the magnetic sensor and the magnetic scale in the direction in which the magnetic sensor and the magnetic scale face each other.

18. The linear conveyor according to claim 17, wherein the magnetic shield is configured to shield the magnetic flux from the linear motor stator toward the magnetic sensor by drawing in magnetic flux emitted from the linear motor stator.

19. A linear conveyor comprising:
a linear motor stator including at least one stator including a core and a coil wound around the core;
a slider including a linear motor mover including a permanent magnet;
a guide rail configured to guide movement of the slider;
a magnetic sensor configured to detect a position of the slider;
a magnetic shield between the magnetic sensor and the linear motor stator and configured to shield magnetic flux from the linear motor stator toward the magnetic sensor; and
a support configured to support the linear motor stator and the guide rail; wherein
the support includes a mounting wall provided between the magnetic sensor and the linear motor stator and protruding upward;

the magnetic sensor is attached to a side surface of the mounting wall on a side opposite to a linear motor stator side; and the magnetic shield is attached to a side surface on the linear motor stator side of the mounting wall common to the magnetic sensor.

20. The linear conveyor according to claim 19, wherein the magnetic shield is configured to shield the magnetic flux from the linear motor stator toward the magnetic sensor by drawing in magnetic flux emitted from the linear motor stator.

\* \* \* \* \*